United States Patent
Gabara

(10) Patent No.: US 8,133,827 B2
(45) Date of Patent: *Mar. 13, 2012

(54) FIBERS COMPRISING COPOLYMERS CONTAINING STRUCTURES DERIVED FROM 4,4 DIAMINO DIPHENYL SULFONE AND A PLURALITY OF ACID MONOMERS AND METHODS OF MAKING SAME

(75) Inventor: Vlodek Gabara, Richmond, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 545 days.

This patent is subject to a terminal disclaimer.

(21) Appl. No.: 12/229,414

(22) Filed: Aug. 22, 2008

(65) Prior Publication Data

US 2009/0053500 A1 Feb. 26, 2009

Related U.S. Application Data

(63) Continuation-in-part of application No. 11/894,969, filed on Aug. 22, 2007, now abandoned.

(51) Int. Cl.
*C08G 12/08* (2006.01)
(52) U.S. Cl. ........ 442/414; 264/103; 428/221; 428/359; 528/265; 528/310; 528/337
(58) Field of Classification Search ................... 442/414; 264/103; 528/265, 310, 337; 428/221, 359
See application file for complete search history.

(56) References Cited

U.S. PATENT DOCUMENTS

| | | | |
|---|---|---|---|
| 3,063,966 A | 11/1962 | Morgan et al. | |
| 3,227,793 A | 1/1966 | Cipriani | |
| 3,287,324 A | 11/1966 | Sweeny | |
| 3,414,645 A | 12/1968 | Morgan, Jr. | |
| 3,767,756 A | 10/1973 | Blades | |
| 3,869,429 A | 3/1975 | Blades | |
| 3,869,430 A | 3/1975 | Blades | |
| 4,169,932 A | 10/1979 | Sokolov et al. | |
| 5,468,537 A | 11/1995 | Brown et al. | |
| 5,536,408 A * | 7/1996 | Wagener et al. | 210/490 |
| 5,667,743 A | 9/1997 | Tai et al. | |
| 7,537,830 B2 * | 5/2009 | Zhu et al. | 428/364 |
| 7,537,831 B2 * | 5/2009 | Zhu et al. | 428/364 |
| 7,700,191 B2 * | 4/2010 | Zhu et al. | 428/364 |
| 2003/0192820 A1 * | 10/2003 | Cho et al. | 210/321.83 |

FOREIGN PATENT DOCUMENTS

| | | |
|---|---|---|
| CN | 1389604 | 1/2003 |
| CN | 1631941 | 6/2005 |
| JP | 62-244404 | * 10/1987 |
| WO | WO 00/77283 | 12/2000 |

* cited by examiner

*Primary Examiner* — Gregory Listvoyb

(57) ABSTRACT

The invention concerns a fiber, obtainable by spinning a copolymer from the polymerization solution, derived from 4,4'diaminodiphenyl sulfone amine monomer and a plurality of acid monomers, wherein the plurality of acid monomers has 55 to 85 mole percent of the monomer containing a para-oriented aromatic group and 15 to 45 mole percent of the monomer containing a meta-oriented aromatic group; and yarns, fabrics and garments comprising this fiber, and methods of making the same. This fiber has use in heat-resistant protective apparel fabrics and garments.

8 Claims, No Drawings

FIBERS COMPRISING COPOLYMERS CONTAINING STRUCTURES DERIVED FROM 4,4 DIAMINO DIPHENYL SULFONE AND A PLURALITY OF ACID MONOMERS AND METHODS OF MAKING SAME

RELATED APPLICATION

The present patent application is a continuation-in-part of Ser. No. 11/894,969 file Aug. 22, 2007 now abandoned.

FIELD OF THE INVENTION

The invention concerns a fiber, obtainable by spinning a copolymer from the polymerization solution, derived from 4,4'diaminodiphenyl sulfone amine monomer and a plurality of acid monomers; and yarns, fabrics and garments comprising this fiber, and methods of making the same. This fiber has use in heat-resistant protective apparel fabrics and garments.

BACKGROUND OF THE INVENTION

Chinese Patent Publication 1389604A to Wang et al. discloses a fiber known as polysulfonamide fiber (PSA) made by spinning a copolymer solution formed from a mixture of 50 to 95 weight percent 4,4'diaminodiphenyl sulfone and 5 to 50 weight percent 3,3'diaminodiphenyl sulfone copolymerized with equimolar amounts of terephthaloyl chloride in dimethylacetamide.

Chinese Patent Publication 1631941A to Chen et al. also discloses a method of preparing a PSA copolymer spinning solution formed from a mixture of 4,4'diaminodiphenyl sulfone and 3,3'diaminodiphenyl sulfone in a mass ratio of from 10:90 to 90:10 copolymerized with equimolar amounts of terephthaloyl chloride in dimethylacetamide.

In both these preparations, the copolymer chain has a high degree of para-orientation for higher temperature structural stability. Unfortunately polymers and/or copolymers having a high degree of para-orientation tend to be insoluble in the normal organic solvents used during polymerization and the polymers and/or copolymers precipitate out of solution, requiring that they to be re-solutioned in another solvent for fiber spinning. Therefore it is believed the addition of the meta-oriented 3,3'diaminodiphenyl sulfone provides enough disorder in this para-oriented system to allow the copolymer to be soluble in dimethylacetamide. Unfortunately, 3,3'diaminodiphenyl sulfone is expensive and is not widely available and therefore is undesirable as a copolymerizing species.

U.S. Pat. No. 4,169,932 to Sokolov et al. discloses preparation of poly(paraphenylene) terephthalamide (PPD-T) copolymers using tertiary amines to increase the rate of polycondensation. This patent discloses the PPD-T copolymer may be formed with terephthalic acid dichloride or a mixture of terephthalic acid dichloride (50-95 mole percent) and an aromatic acid dichloride of the diphenyl series (50-5 mole percent). This patent also discloses the PPD-T copolymer can be made by replacing 5 to 50 mole percent of the paraphenylene diamine (PPD) by another aromatic diamine such as 4,4'diaminodiphenyl sulfone, and provides an example of such a copolymer containing 95 mole percent paraphenylene diamine and 5 mole percent 4,4'diaminodiphenyl sulfone. While fibers made from the copolymers of Sokolov et al. are para-oriented, one of the benefits of PSA fiber is the high quantity of sulfone groups in the polymer chain which has been associated with good textile aesthetics (such as softness and dyeability), something that would not be possible with the high PPD-content polymers of Sokolov.

Therefore, what is needed is a copolymer that is both soluble in normal organic solvents, has a high degree of para-oriented diamines for high temperature stability, and also has a high quantity of sulfone groups in the polymer chain.

SUMMARY OF THE INVENTION

In some embodiments, this invention relates to a fiber comprising a copolymer having a structure derived from the reaction of an amine monomer and a plurality of acid monomers, wherein the amine monomer is at least 80 mole percent 4,4'diaminodiphenyl sulfone and the plurality of acid monomers include those having a structure of

the plurality of acid monomers having 55 to 85 mole percent of the monomer containing aromatic group $Ar_1$ and 15 to 45 mole percent of the monomer containing the aromatic group $Ar_2$, wherein the aromatic group $Ar_1$ has para-oriented benzene ring and the aromatic group $Ar_2$ has meta-oriented benzene ring.

In some other embodiments, this invention relates to a method of producing a fiber comprising the steps of a) forming a copolymer by reacting an amine monomer and a plurality of acid monomers, wherein the amine monomer is at least 80 mole percent 4,4'diaminodiphenyl sulfone and the plurality of acid monomers include those having a structure of:

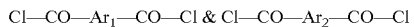

the plurality of acid monomers having 55 to 85 mole percent of the monomer containing aromatic group $Ar_1$ and 15 to 45 mole percent of the monomer containing the aromatic group $Ar_2$, wherein the aromatic group $Ar_1$ has para-oriented benzene ring and the aromatic group $Ar_2$ has meta-oriented benzene ring; b) providing the copolymer in a solution suitable for spinning fibers; and c) spinning fibers from the copolymer solution.

DETAILED DESCRIPTION

The invention concerns a fiber, obtainable by spinning a copolymer from the polymerization solution, derived from 4,4'diaminodiphenyl sulfone amine monomer and a plurality of acid monomers. In some preferred embodiments the fiber is a flame-resistant fiber having limiting oxygen index of 21 or greater. By "flame resistant" it is meant the spun staple yarn, or fabrics made from the yarn, will not support a flame in air. In preferred embodiments the fabrics have a limiting oxygen index (LOI) of about 26 and higher.

For purposes herein, the term "fiber" is defined as a relatively flexible, macroscopically homogeneous body having a high ratio of length to the width of the cross-sectional area perpendicular to that length. The fiber cross section can be any shape, but is typically round. Herein, the term "filament" or "continuous filament" is used interchangeably with the term "fiber."

As used herein, the term "staple fibers" refers to fibers that are cut to a desired length or are stretch broken, or fibers that occur naturally with or are made having a low ratio of length to the width of the cross-sectional area perpendicular to that length when compared with filaments. Man made staple fibers are cut or made to a length suitable for processing on cotton, woolen, or worsted yarn spinning equipment. The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a length of about 0.25 centimeters (0.1 inches) to about 30 centimeters (12 inches). In some embodiments, the length of a staple fiber is from about 1 cm (0.39 in) to about 20 cm (8 in). In some preferred embodiments the staple fibers made by short staple processes have a staple fiber length of about 1 cm (0.39 in) to about 6 cm (2.4 in). The term continuous filament refers to a flexible fiber having relatively small-diameter and whose length is longer than those indicated for staple fibers.

By copolymer fibers having a structure derived from the amine monomer 4,4'diaminodiphenyl sulfone, it is meant the copolymer was made from a monomer generally having the structure:

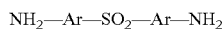

$$NH_2-Ar-SO_2-Ar-NH_2$$

wherein Ar is any unsubstituted or substituted six-membered aromatic group of carbon atoms having para-oriented linkages with the $SO_2$ group. In one preferred embodiment Ar is an unsubstituted benzyl ring. The copolymer has at least 80 mole percent 4,4'diaminodiphenyl sulfone to help provide para-orientation, and subsequently high temperature stability, to the copolymer. In one embodiment substantially all (95 mole percent or greater) of the amine monomer is derived from 4,4'diaminodiphenyl sulfone structures.

The amine monomer or monomers are copolymerized with a plurality of acid monomers in a compatible solvent to create a copolymer. The plurality of acids monomers include those having the structures

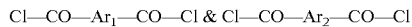

$$Cl-CO-Ar_1-CO-Cl \; \& \; Cl-CO-Ar_2-CO-Cl$$

wherein $Ar_1$ and $Ar_2$ are any unsubstituted or substituted aromatic ring structures and are the same or different, however, if they are the same, they have different linkage orientation in the structure. In some preferred embodiments $Ar_1$ and $Ar_2$ are both unsubstituted six-membered aromatic groups of carbon atoms and the aromatic group $Ar_1$ has para-oriented linkages and aromatic group $Ar_2$ has meta-oriented linkages. For example, $Ar_1$ and $Ar_2$ can be both benzene rings while $Ar_1$ can be a benzene ring having para-oriented linkages while $Ar_2$ has meta-oriented linkages. Examples of useful monomers include terephthaloyl chloride, isophthaloyl chloride, and the like. In some preferred embodiments, the plurality of acid monomer includes terephthaloyl chloride and isophthaloyl chloride.

In some embodiments, the plurality of acid monomers has 55 to 85 mole percent of the monomer containing aromatic group $Ar_1$ and 15 to 45 mole percent of the monomer containing the aromatic group $Ar_2$. In some other preferred embodiments, the plurality of acid monomers includes 55 to 85 mole percent of acid monomers having para-oriented aromatic groups and 15 to 45 mole percent acid monomers having meta-oriented aromatic groups.

It is believed that at least 15 percent of the total amount of aromatic monomers used to make the copolymer should contain monomers having meta-oriented functionality in order for the final copolymer to be soluble in the polymerization solvent and suitable for spinning fibers. By "total amount of aromatic monomers" is meant the total of all amine monomers and acid monomers added together. In other words, if the mixture of acid monomers contains only 15 mole percent of acid monomers having meta-oriented aromatic groups, at least 15 mole percent of the amine monomers must have meta-oriented aromatic groups, to make the total amount of aromatic monomers used to be 15 percent; based on a 1-to-1 amine-acid stoichiometry. In some embodiments 20 to 30 percent of the total amount of aromatic monomers used to make the copolymer contain monomers having meta-oriented functionality. In some embodiments, the maximum amount of monomers having para-oriented functionality is 85 percent of the total amount of aromatic monomers used to make the copolymer.

In a one embodiment, these fiber having a limiting oxygen index (LOI) of 21 or greater, meaning the fiber or fabrics made solely from the fiber will not support a flame in air. In some preferred embodiments the textile staple fiber has a LOI of at least 26 or greater.

In some embodiments the fiber has a break tenacity of at least 3 grams per denier (2.7 grams per dtex) or greater, and in some preferred embodiments the fiber has a break tenacity of at least 4 grams per denier (3.6 grams per dtex) or greater.

Fabrics can be made from the fibers, or from spun staple yarns or multifilament continuous yarns comprising the fibers, and such fabrics can include but are not limited to woven or knitted fabrics. Such fabrics are well known to those skilled in the art. By "woven" fabric is meant a fabric usually formed on a loom by interlacing warp or lengthwise yarns and filling or crosswise yarns with each other to generate any fabric weave, such as plain weave, crowfoot weave, basket weave, satin weave, twill weave, and the like. Plain and twill weaves are believed to be the most common weaves used in the trade and are preferred in many embodiments.

By "knitted" fabric is meant a fabric usually formed by interlooping yarn loops by the use of needles. In many instances, to make a knitted fabric spun staple yarn is fed to a knitting machine which converts the yarn to fabric. If desired, multiple ends or yarns can be supplied to the knitting machine either plied of unplied; that is, a bundle of yarns or a bundle of plied yarns can be co-fed to the knitting machine and knitted into a fabric, or directly into a article of apparel such as a glove, using conventional techniques. In some embodiments it is desirable to add functionality to the knitted fabric by co-feeding one or more other staple or continuous filament yarns with one or more spun staple yarns having the intimate blend of fibers. The tightness of the knit can be adjusted to meet any specific need. A very effective combination of properties for protective apparel has been found in for example, single jersey knit and terry knit patterns.

In some particularly useful embodiments, the fibers and yarns containing the fibers can be used to make flame-resistant garments. In some embodiments the garments can have essentially one layer of the protective fabric made from the spun staple yarn. Exemplary garments of this type include jumpsuits and coveralls for fire fighters or for military personnel. Such suits are typically used over the firefighters clothing and can be used to parachute into an area to fight a forest fire. Other garments can include pants, shirts, gloves, sleeves and the like that can be worn in situations such as chemical processing industries or industrial electrical/utility where an extreme thermal event might occur. In some preferred embodiments the fabrics have an arc resistance of at least 0.8 calories per square centimeter per ounce per square yard.

In other embodiments the fibers and yarns containing the fibers can be used in any layer of multilayer flame-resistant garments having a general construction such as disclosed in U.S. Pat. No. 5,468,537. Such garments generally have three layers or three types of fabric constructions, each layer or fabric construction performing a distinct function. There is an outer shell fabric that provides flame protection and serves as a primary defense from flames for the fire fighter. Adjacent the outer shell is a moisture barrier that is typically a liquid barrier but can be selected such that it allows moisture vapor to past through the barrier. Laminates of Gore-Tex® PTFE membrane or Neoprene® membranes on a fibrous nonwoven or woven meta-aramid scrim fabric are moisture barriers typically used in such constructions. Adjacent the moisture barrier is a thermal liner, which generally includes a batt of heat resistant fiber attached to an internal face cloth. The moisture barrier keeps the thermal liner dry and thermal liner protects the wearer from heat stress from the fire or heat threat being addressed by the wearer.

In another embodiment, this invention relates to a method of producing a fiber comprising the steps of a) forming a copolymer by reacting an amine monomer and a plurality of acid monomers, wherein the amine monomer is at least 80 mole percent 4,4'diaminodiphenyl sulfone and the plurality of acid monomers include those having a structure of:

the aromatic group $Ar_1$ being different from the aromatic group $Ar_2$; b) providing the copolymer in a solution suitable for spinning fibers; and c) spinning fibers from the copolymer solution.

In one embodiment, the polymer and copolymer derived from a sulfone monomer can preferably be made via polycondensation of one or more types of diamine monomer with one or more types of chloride monomers in a dialkyl amide solvent such as N-methyl pyrrolidone, dimethyl acetamide, or mixtures thereof. In some embodiments of the polymerizations of this type an inorganic salt such as lithium chloride or calcium chloride is also present. If desired the polymer can be isolated by precipitation with non-solvent such as water, neutralized, washed, and dried. The general polymerization techniques disclosed in Chinese Patent Publications 1389604A to Wang et al. and 1631941A to Chen et al. can be applied to these solutions, and if desired the techniques disclosed in U.S. Pat. No. 4,169,932 to Sokolov et al. can also be followed. The polymer can also be made via interfacial polymerization which produces polymer powder directly that can then be dissolved in a solvent for fiber production.

The polymer or copolymer can be spun into fibers via solution spinning, using a solution of the polymer or copolymer in either the polymerization solvent or another solvent for the polymer or copolymer. Fiber spinning can be accomplished through a multi-hole spinneret by dry spinning, wet spinning, or dry-jet wet spinning (also known as air-gap spinning) to create a multi-filament yarn or tow as is known in the art. The fibers in the multi-filament yarn or tow after spinning can then be treated to neutralize, wash, dry, or heat treat the fibers as needed using conventional technique to make stable and useful fibers. Exemplary dry, wet, and dry-jet wet spinning processes are disclosed U.S. Pat. Nos. 3,063,966; 3,227,793; 3,287,324; 3,414,645; 3,869,430; 3,869,429; 3,767,756; and 5,667,743.

Continuous filament fibers and multifilament yarns of continuous filaments can be made by processes well known to those skilled in the art. For example, multifilament continuous filament yarns can be made by winding filament threadlines directly on a bobbin, with or without twist; or if needed, combining multiple filament threadlines to form higher denier yarns.

Alternatively, continuous filament can be converted into staple fiber by any number of ways known in the art, including processes that creel a number of bobbins of continuous filaments and concurrently cut the filaments to form cut staple fibers. For example, the staple fibers can be cut from continuous straight fibers using a rotary cutter or a guillotine cutter resulting in straight (i.e., non crimped) staple fiber, or additionally cut from crimped continuous fibers having a saw tooth shaped crimp along the length of the staple fiber, with a crimp (or repeating bend) frequency of preferably no more than 8 crimps per centimeter.

The staple fibers can also be formed by stretch breaking continuous fibers resulting in staple fibers with deformed sections that act as crimps. Stretch broken staple fibers can be made by breaking a tow or a bundle of continuous filaments during a stretch break operation having one or more break zones that are a prescribed distance creating a random variable mass of fibers having an average cut length controlled by break zone adjustment.

Generally these staple fibers are formed into bales; the staple fibers are then formed into spun staple yarns by processes that involve first opening the bales of staple fibers and then further processing the clumps of staple fibers in openers, blenders, and cards to form slivers of staple fibers. Generally, in the individual staple fibers are opened or separated to a degree that is normal in fiber processing to make a useful fabric, such that fiber knots or slubs and other major defects due to poor opening of the staple fibers are not present in an amount that detract from the final fabric quality. A carding machine is commonly used to separate, align, and deliver fibers into a continuous strand of loosely assembled fibers without substantial twist, commonly known as carded sliver. The carded sliver is processed into drawn sliver, typically by, but not limited to, a two-step drawing process.

Spun staple yarns are then formed from the drawn sliver using conventional techniques. These techniques include conventional cotton system, short-staple spinning processes, such as, for example, open-end spinning, ring-spinning, or higher speed air spinning techniques such as Murata air-jet spinning where air is used to twist the staple fibers into a yarn. The formation of spun yarns useful in fabrics can also be achieved by use of conventional woolen systems, long-staple or stretch-break spinning processes, such as, for example, worsted or semi-worsted ring-spinning.

Regardless of the processing system, ring-spinning is the generally preferred method for making the spun staple yarns using traditional long and short staple ring spinning processes that are well known in the art. For short staple, cotton system spinning fiber lengths from about 1.9 to 5.7 cm (0.75 in to 2.25 in) are typically used. For long staple, worsted or woolen system spinning, fibers up to about 16.5 cm (6.5 in) are typically used.

Spun staple yarns can also be made directly by stretch breaking using stretch-broken tow to top staple processes. The staple fibers in the yarns formed by traditional stretch break processes typically have length of up to about 18 cm (7 in) long. However spun staple yarns made by stretch breaking can also have staple fibers having maximum lengths of up to around 50 cm (20 in.) through processes as described for example in PCT Patent Application No. WO 0077283. Stretch broken staple fibers normally do not require crimp because the stretch-breaking process imparts a degree of crimp into the fiber.

TEST METHODS

Basis weight values were obtained according to FTMS 191A; 5041.

Arc Resistance Test. The arc resistance of fabrics is determined in accordance with ASTM F-1959-99 "Standard Test Method for Determining the Arc Thermal Performance Value of Materials for Clothing". The Arc Thermal Performance Value (ATPV) of each fabric, which is a measure of the amount of energy that a person wearing that fabric could be exposed to that would be equivalent to a 2nd degree burn from such exposure 50% of the time.

Grab Test. The grab resistance of fabrics (the break tensile strength) is determined in accordance with ASTM D-5034-95 "Standard Test Method for Breaking Strength and Elongation of Fabrics (Grab Test)".

Thermal Protection Performance (TPP) Test. The thermal protection performance of fabrics is determined in accordance with NFPA 2112 "Standard on Flame Resistant Garments for Protection of Industrial Personnel Against Flash Fire". The thermal protective performance relates to a fabric's ability to provide continuous and reliable protection to a wearer's skin beneath a fabric when the fabric is exposed to a direct flame or radiant heat.

Vertical Flame Test. The char length of fabrics is determined in accordance with ASTM D-6413-99 "Standard Test Method for Flame Resistance of Textiles (Vertical Method)".

Limiting Oxygen Index (LOI) is the minimum concentration of oxygen, expressed as a volume percent, in a mixture of oxygen and nitrogen that will just support the flaming combustion of a material initially at room temperature under the conditions of ASTM G125/D2863.

EXAMPLES

The invention is illustrated by, but is not intended to be limited by the following examples:

Example 1

The solvent dimethyl acetamide is purified and is dried before use by distillation in the presence of $P_2O_5$. 200 grams of this solvent is placed in a flask equipped with a mechanical stirrer and a nitrogen inlet. 24.8 grams of 4,4'-diaminodiphenyl sulfone is dissolved in the solvent and the solution is cooled to 0° C. by water/ice bath. In a dry box a 70%/30% molar mixture of 14.21 grams of terephthaloyl chloride (TCL) is mixed with 6.09 grams of isophthaloyl chloride (ICL). The mixture of acid chlorides is added to the flask with agitation. The cooling bath is removed and the polymerization is continued for 30 minutes. At that point 7.4 grams of calcium hydroxide is added to neutralize HCl which is a byproduct of the polymerization. The resulting material is a viscous solution that is spun into fibers and the fibers are processed into fabrics and garments.

Comparative Example A

Example 1 is repeated except that 20.3 grams of terephthaloyl chloride (TCL) is used as the sole acid monomer in place of a mixture of TCL and ICL. Upon addition of the TCL, polymer precipitates from the solution. The resulting polymerization mixture becomes hazy and is not useful for spinning fibers as is contains particles Example 2

Example 1 is repeated except that the acid chlorides are not first mixed but are added separately to the flask with agitation. A viscous copolymer solution results that after degassing is used to form fibers that are subsequently processed into fabrics and garments.

Example 3

Example 1 is repeated except that the solvent dimethyl acetamide is replaced with N-methyl pyrrolidone without changes in the procedure. A viscous copolymer solution results that after degassing is used to form fibers that are subsequently processed into fabrics and garments.

Example 4

Example 1 is repeated except that 45 parts by weight of ICL and 55 parts by weight TCL are used based on the total weight of the acid monomer added in that Example. A viscous copolymer solution results that after degassing is used to form fibers that are subsequently processed into fabrics and garments.

Example 6

A thermally protective and durable fabric is prepared having in both the warp and fill ring spun yarns comprising a staple fiber of the process of Example 1. A sliver is prepared and is processed by conventional cotton system equipment and is then spun into a spun staple yarn having twist multiplier 4.0 and a single yarn size of about 21 tex (28 cotton count) using a ring spinning frame. Two single yarns are then plied on a plying machine to make a flame resistant two-ply warp yarn. Using a similar process and the same twist a 24 tex (24 cotton count) yarn is made for use in the fill. As before, two of these single yarns are plied to form a flame resistant two-ply fill yarn.

The yarns are then used as the warp and fill yarns and are woven into a fabric on a shuttle loom, making a greige fabric having a 2×1 twill weave and a construction of 26 ends×17 picks per cm (72 ends×52 picks per inch), and a basis weight of about 215 g/m² (6.5 oz/yd²). The greige twill fabric is then scoured in hot water and is dried under low tension. The scoured fabric is then jet dyed using basic dye. The finished fabric has a basis weight of about 231 g/m² (7 oz/yd²). The fabrics are used to make protective garments suitable for people who work near flames or high temperatures.

Example 7

Example 1 is repeated, except an approximate 90%/10% molar mixture of 22.3 grams of 4,4'-diaminodiphenyl sulfone and 2.5 grams of paraphenylene diamine are used. The resulting material is a viscous solution that is spun into fibers and the fibers are processed into fabrics and garments.

Example 8

Example 1 is repeated, except an approximate 90%/10% molar mixture of 22.3 grams of 4,4'-diaminodiphenyl sulfone and 2.5 grams of metaphenylene diamine are used and a 80%/20% molar mixture of 16.89 grams of terephthaloyl chloride (TCL) is mixed with 4.22 grams of isophthaloyl chloride (ICL). The resulting material is a viscous solution that is spun into fibers and the fibers are processed into fabrics and garments

What is claimed:

1. A staple fiber having a macroscopically homogeneous body comprising a copolymer having a structure derived from the reaction of an amine monomer and a plurality of acid monomers, wherein
  i) the amine monomer is at least 80 mole percent 4,4'diaminodiphenyl sulfone; and
  ii) the plurality of acid monomers include those having a structure of $$Cl-CO-Ar_1-CO-Cl \,\&\, Cl-CO-Ar_2-CO-Cl$$

wherein the plurality of acid monomers has 55 to 85 mole percent of the monomer containing aromatic group $Ar_1$ and 15 to 45 mole percent of the monomer containing the aromatic group $Ar_2$; and wherein the aromatic group $Ar_1$ is aromatic group having para-oriented linkages and the aromatic group $Ar_2$ is a an aromatic group having meta-oriented linkages.

2. The staple fiber of claim 1 wherein the plurality of acid monomers includes terephthaloyl chloride, isophthaloyl chloride and mixtures thereof.

3. A flame-resistant yarn comprising the staple fiber of claim 1 having a limiting oxygen index of 21 or greater.

4. The flame-resistant yarn of claim 3 having a limiting oxygen index of 26 or greater.

5. A flame-resistant yarn comprising the fiber of claim 1 wherein the yarn has a tenacity of 3 grams per denier (2.7 grams per dtex) or greater.

6. The flame-resistant yarn of claim 5 wherein the yarn has a tenacity of 4 grams per denier (3.6 grams per dtex) or greater.

7. A fabric comprising the staple fiber of claim 1.

8. A protective garment comprising the staple fiber of claim 1.

* * * * *